United States Patent
Chien

(10) Patent No.: US 10,139,954 B2
(45) Date of Patent: Nov. 27, 2018

(54) DISPLAY DEVICE AND OPERATING METHOD THEREOF

(71) Applicants: Qisda Optronics (Suzhou) Co., Ltd., Suzhou, Jiangsu (CN); Qisda Corporation, Taoyuan (TW)

(72) Inventor: Hung-Chang Chien, Taoyuan (TW)

(73) Assignees: Qisda Optronics (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 0 days.

(21) Appl. No.: 15/468,077

(22) Filed: Mar. 23, 2017

(65) Prior Publication Data

US 2017/0285845 A1 Oct. 5, 2017

(30) Foreign Application Priority Data

Mar. 30, 2016 (TW) .............................. 105110159 A

(51) Int. Cl.
| | |
|---|---|
| G06F 3/041 | (2006.01) |
| G09G 3/20 | (2006.01) |
| G09G 5/10 | (2006.01) |
| G09G 5/36 | (2006.01) |

(52) U.S. Cl.
CPC .......... *G06F 3/0416* (2013.01); *G06F 3/0412* (2013.01); *G09G 3/20* (2013.01); *G09G 3/2003* (2013.01); *G09G 5/10* (2013.01); *G09G 5/363* (2013.01); *G06F 2203/04108* (2013.01); *G09G 2354/00* (2013.01)

(58) Field of Classification Search
CPC ............. G06F 2203/04101; G06F 2203/04108
USPC .................................................. 345/173–178
See application file for complete search history.

(56) References Cited

U.S. PATENT DOCUMENTS

| 8,428,658 B2* | 4/2013 | Han ................... G06F 3/04883 345/173 |
| 2009/0021491 A1* | 1/2009 | Kawamura ............ B60K 35/00 345/173 |
| 2009/0160809 A1* | 6/2009 | Yang ..................... G06F 3/0488 345/173 |
| 2013/0100026 A1* | 4/2013 | Vitsnudel ................ G06F 3/042 345/168 |
| 2014/0176456 A1* | 6/2014 | Yoon .................... G09G 3/3208 345/173 |

(Continued)

FOREIGN PATENT DOCUMENTS

CN 105023552 11/2015

*Primary Examiner* — Roy P Rabindranath

(57) ABSTRACT

A display device includes a display panel, at least one touch sensor, a touch sensor controller and a display controller. The at least one touch sensor senses and outputs a touch sensing signal. The touch sensor controller, electrically coupled to the touch sensor, receives the touch sensing signal and generates a touch sensing result accordingly. The display controller, electrically coupled to the display panel and the touch sensor controller, receives graphic data to generate first display data and determines whether to adjust the first display data to second display data and transmit the second display data to the display panel according to the touch sensing result. The first display data has first display a feature, the second display data has a second feature, and the first display feature is different from the second display feature. An operating method of the display device is also provided.

8 Claims, 4 Drawing Sheets

(56) References Cited

U.S. PATENT DOCUMENTS

2014/0375677 A1* 12/2014 Shin .................. G06F 3/041
                                                                    345/629

* cited by examiner

DISPLAY DEVICE AND OPERATING METHOD THEREOF

FIELD OF THE INVENTION

The present invention relates to a display device, and more particularly to a display device capable of automatically adjusting display features of display data and an operating method thereof.

BACKGROUND OF THE INVENTION

In order to facilitate teaching or conducting presentations, a display device such as an electronic whiteboard has been developed. While using a conventional electronic whiteboard, a user may need to be close to the electronic whiteboard when desiring to operate or explain the currently displayed image on the electronic whiteboard. However, since the electronic whiteboard is designed to let the display data be seen by a user at a certain distance away from the electronic whiteboard, ordinary display features of the display data may not be suitable for the eyes of the user who is close to the electronic whiteboard. For example, brightness of display data of the electronic whiteboard may be designed to be higher than that suitable for the user's eyes. Therefore, the user may suffer discomfort to his/her eyes caused by the display features of display data when the user is close to the electronic whiteboard.

SUMMARY OF THE INVENTION

Therefore, one objective of the present invention is to provide a display device and an operating method thereof, in order to solve the above-mentioned problem of discomfort to the eyes of a user when the user is close to a display device.

The present invention provides a display device, which includes a display panel, at least one touch sensor, a touch sensor controller and a display controller. The at least one touch sensor is configured to sense and output a touch sensing signal. The touch sensor controller is electrically coupled to the at least one touch sensor and configured to receive the touch sensing signal and generate a touch sensing result accordingly. The display controller is electrically coupled to the display panel and the touch sensor controller and configured to receive graphic data to generate first display data and determine whether to adjust the first display data to second display data and transmit the second display data to the display panel according to the touch sensing result. The first display data has a first display feature, the second display data has a second display feature, and the first display feature is different from the second display feature.

In one preferred embodiment of the display device of the present invention, the first display feature is a first brightness or a first color temperature, and the second display feature is a second brightness or a second color temperature.

The present invention further provides an operating method of a display device. The display device includes a display panel, a display controller, a touch sensor controller and at least one touch sensor. The display controller is electrically coupled to the display panel and the touch sensor controller. The at least one touch sensor is electrically coupled to the touch sensor controller and configured to output a touch sensing signal to the touch sensor controller. The touch sensor controller is configured to generate a touch sensing result according to the touch sensing signal. The operating method includes steps of: configuring the display controller to generate first display data according to graphic data; configuring the display controller to determine whether to adjust the first display data to second display data according to the touch sensing result; and configuring the display panel to receive and display the first display data or the second display data. The first display data has a first display feature, the second display data has a second display feature, and the first display feature is different from the second display feature.

In one preferred embodiment of the operating method of a display device of the present invention, the first display feature is a first brightness or a first color temperature, and the second display feature is a second brightness or a second color temperature.

In summary, the display controller of the present invention can determine whether to change the display feature of the display data according to the touch sensing result generated by the touch sensor controller. Specifically, when a touch event occurs (i.e., the user is close to the display device), the display device of the present invention can adjust the display feature of the display data (e.g., brightness or color temperature) to improve visual comfort, so that the user can have a better user experience of the display device.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
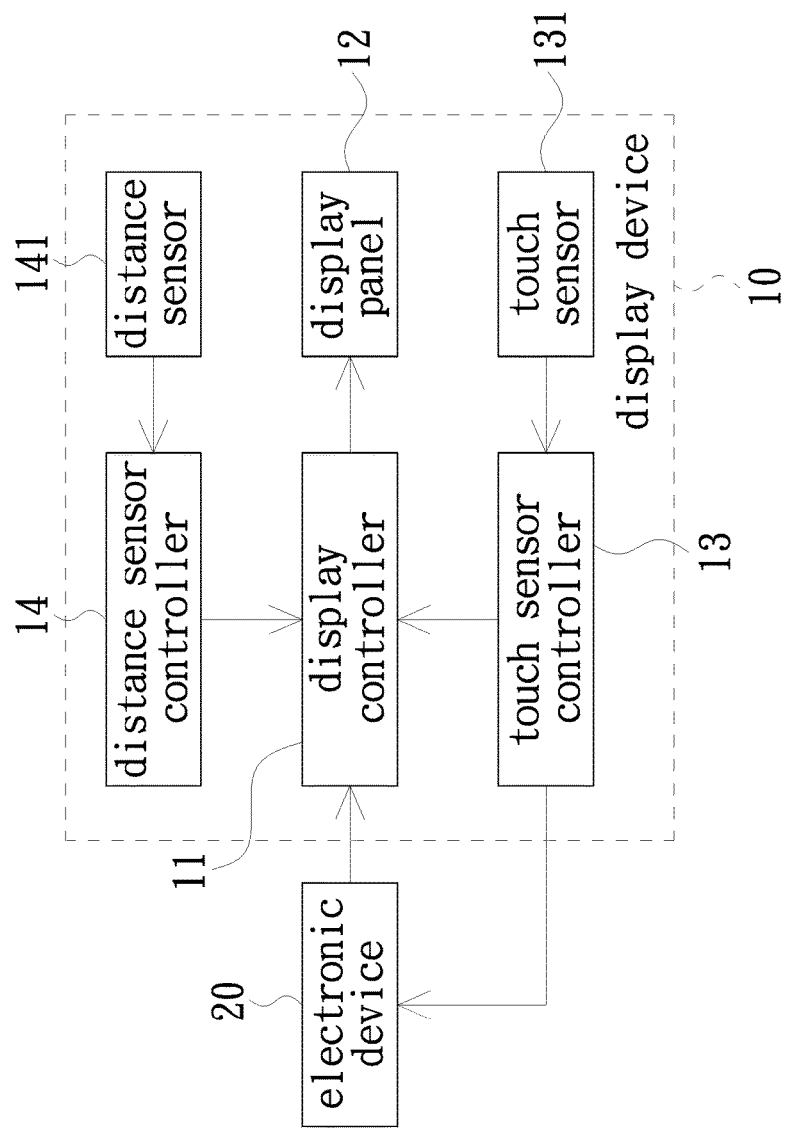
FIG. 1A is a schematic block view of a display device in accordance with an embodiment of the present invention.

Please refer to FIG. 1A, which is a schematic block view of a display device in accordance with an embodiment of the present invention. The display device 10 of the present embodiment may be an electronic display device such as an electronic whiteboard. As shown in FIG. 1A, the display device 10 includes a display controller 11, a display panel 12, a touch sensor controller 13 and a plurality of touch sensors 131. The touch sensor controller 13 is electrically coupled to the touch sensors 131. The touch sensors 131 may be capacitive touch sensors or resistive touch sensors, but the present invention is not limited thereto. The touch sensors 131 may be disposed in the display panel 12 and configured to sense whether a touch event has occurred and output a plurality of touch sensing signals accordingly. The touch sensor controller 13 is configured to receive the touch sensing signals from the touch sensors 131 and generate a touch sensing result according to the received touch sensing signals. The touch sensing result may be information indicating is the detection of a touch event and the occurrence position and track of the touch event. The display controller 11 is electrically coupled to the touch sensor controller 13 and the display panel 12. The display controller 11 is configured to receive external graphic data and generate first display data according to the graphic data. The display controller 11 is further configured to receive the touch sensing result from the touch sensor controller 13 and determine whether to adjust the first display data to second display data corresponding to the touch sensing result according to the touch sensing result. The display controller 11 is still further configured to determine whether to transmit the first display data or the second display data to the display panel 12 for displaying. The first display data has a first display feature, the second display data has a second display feature, and the first display feature is different from the second display feature. The first display feature may be a first brightness or a first color temperature, and the second display feature may be a second brightness or a second color temperature. The display feature may further include contrast, sharpness, color shift, etc., but the present invention is not limited thereto.

In other embodiments, the display device 10 further includes a distance sensor controller 14 and a plurality of distance sensors 141. The distance sensor 141 may be an infrared distance sensor, but the present invention is not limited thereto. The distance sensor 141 is configured to sense the distance between an object and the distance sensor 141 and output a distance sensing signal accordingly. The distance sensor controller 14 is electrically coupled to the distance sensors 141 and configured to receive the distance sensing signals from the distance sensors 141 and generate a distance sensing result accordingly. The distance sensing result may indicate, for example, whether the distance between a user and the distance sensor 141 is less than a predetermined distance (e.g., 30 cm). The distance sensor controller 14 is further configured to transmit the distance sensing result to the display controller 11. Thus, the display controller 11 can determine whether to adjust the current display data (e.g., the first display data) to third display data according to the distance sensing result and transmit the third display data to the display panel 12 for display. The third display data has a third display feature different from the display features of the first display data and the second display data. The third display feature includes a third brightness or a third color temperature, but the present invention is not limited thereto.

In addition, the display device 10 is electrically coupled to an external electronic device 20, which may be a device such as a laptop computer, a desktop computer, a tablet computer or the like. Specifically, the electronic device 20 is electrically coupled to the touch sensor controller 13 and the display controller 11. The electronic device 20 is configured to receive the touch sensing result from the touch sensor controller 13 and generate the graphic data according to the touch sensing result. For example, according to the touch sensing result, the electronic device 20 adds a touch track to the currently displayed graphic data to generate graphic data that contains the touch track and transmit the touch track-containing graphic data to the display controller 11. The display controller 11 then displays according to the currently received graphic data.

Figure 1B:
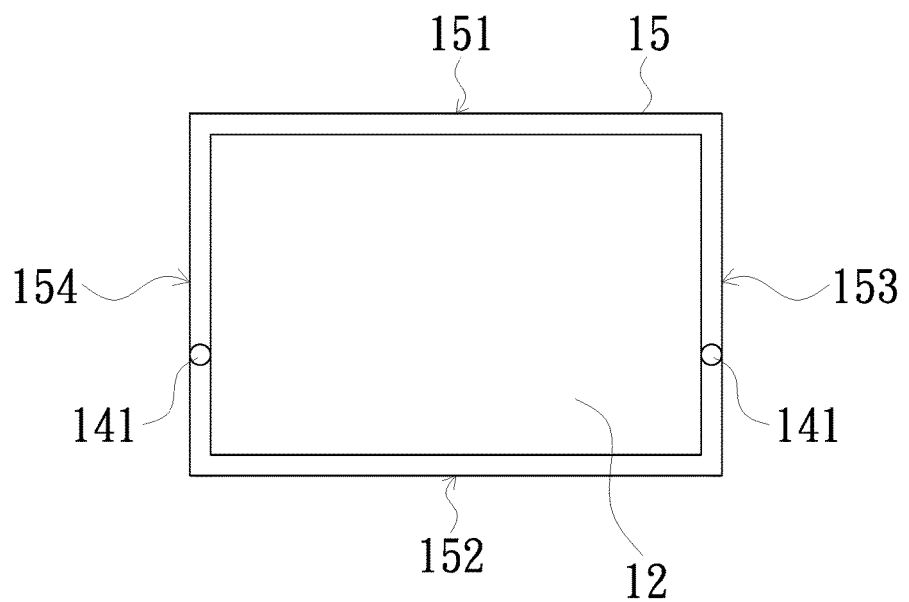
FIG. 1B is a schematic view of an arrangement of distance sensors in accordance with an embodiment of the present invention.

As shown in FIG. 1B, the display device 10 may be a rectangle and includes a display panel 12 facing the user and a frame 15 surrounding the display panel 12. The frame 15 includes a first edge 151, a second edge 152, a third edge 153 and a fourth edge 154. The first edge 151 and the second edge 152 are parallel to a horizontal line, and the third edge 153 and the fourth edge 154 are perpendicular to the horizontal line. The location of the first edge 151 is higher than that of the second edge 152; and the first edge 151, the third edge 153, the second edge 152 and the fourth edge 154 are sequentially arranged clockwise. The third edge 153 and the fourth edge 154 each has a length, and the distance sensor 141 may be disposed at the third edge 153 (or the fourth edge 154) and spaced apart from the first edge 151 for a distance of about two thirds of the length of the third edge 153 (or the fourth edge 154). Since the display device 10 is disposed at a position slightly higher than the user, the distance between the user and the distance sensor 141 can be detected efficiently by setting the distance sensor 141 at a position about two thirds of the length of the third edge 153 (or the fourth edge 154) away from the first edge 151, thereby effectively reducing the quantity of distance sensors 141 and additional cost.

Figure 2:
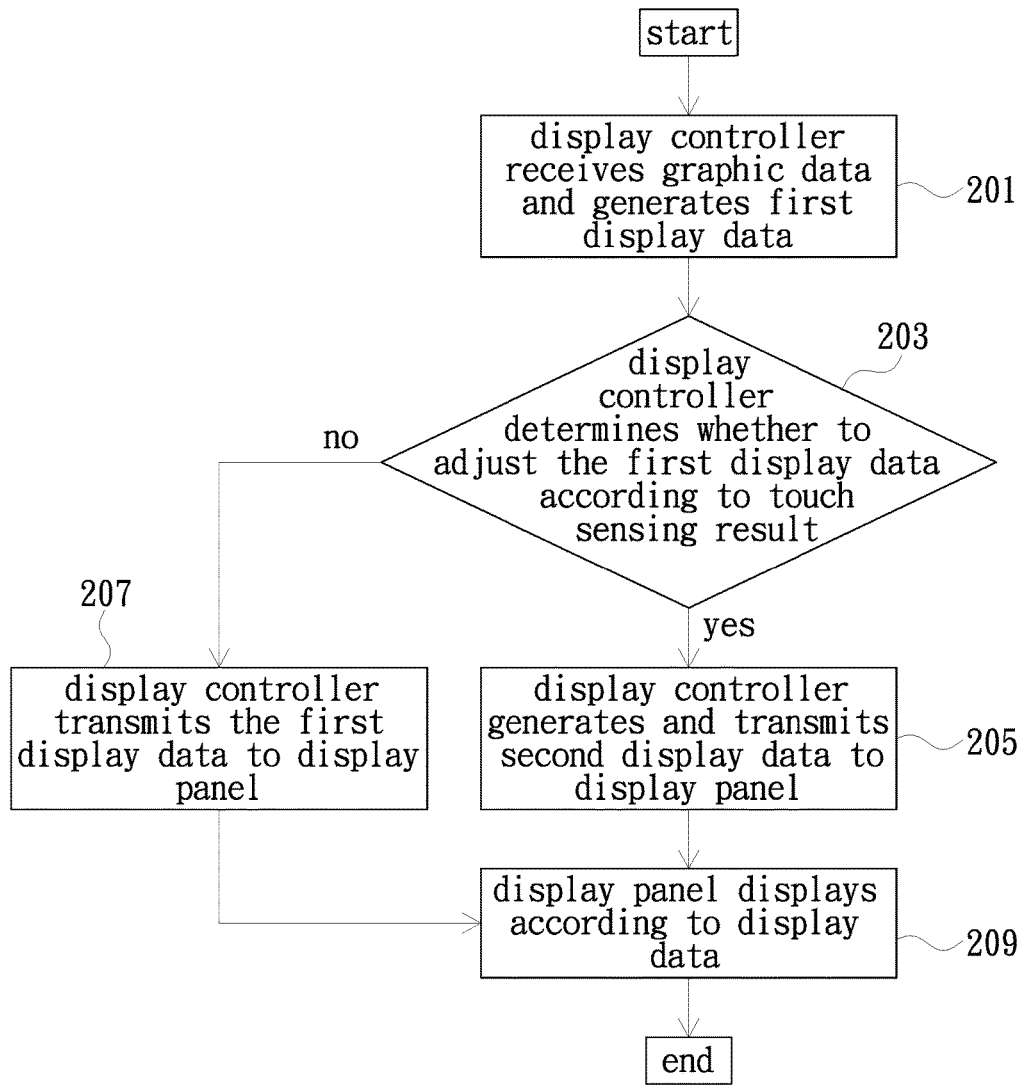
FIG. 2 is a flow chart of an operating method of a display device in accordance with the first embodiment of the present invention.

FIG. 2 is a flow chart of an operating method of the display device 10 in accordance with the first embodiment of the present invention. First, in step 201, the display controller 11 receives the graphic data from the electronic device 20 and generates the first display data according to the received graphic data. Thereafter, in step 203, the display controller 11 determines whether to adjust the display data according to the touch sensing result. Specifically, step 205 is performed when it is determined that a touch event has occurred according to the touch sensing result; alternatively, step 207 is performed when it is determined that no touch event has occurred according to the touch sensing result. In step 205, the display controller 11 adjusts the current display data to the second display data and transmits the second display data to the display panel 12. For example, the first display data is adjusted to the second display data; that is, the first brightness of the first display data is adjusted to the second brightness, or the first color temperature of the first display data is adjusted to the second color temperature, or the first brightness of the first display data is adjusted to the second brightness while the first color temperature of the first display data is adjusted to the second color temperature. The second brightness is lower than the first brightness and the second color temperature is lower than the first color temperature, but the present invention is not limited thereto. In step 207, since no touch event has occurred (i.e., no user is close to the display device 10), the display controller 11 transmits the current display data (e.g., the first display data) to the display panel 12 and displays according to the original first brightness and the first color temperature of the first display data. Thereafter, in step 209, the display panel 12 displays according to the received first display data or the second display data. In this embodiment, since the display controller 11 adjusts the current first display data to the second display data having a lower brightness or a lower color temperature when a touch event occurs (i.e., when a user is close to the display device 10), the display feature of the current display data can be adjusted to a display feature suitable for reception by the user's eyes and the comfort of the user when viewing the display device 10 can be effectively enhanced.

Figure 3:
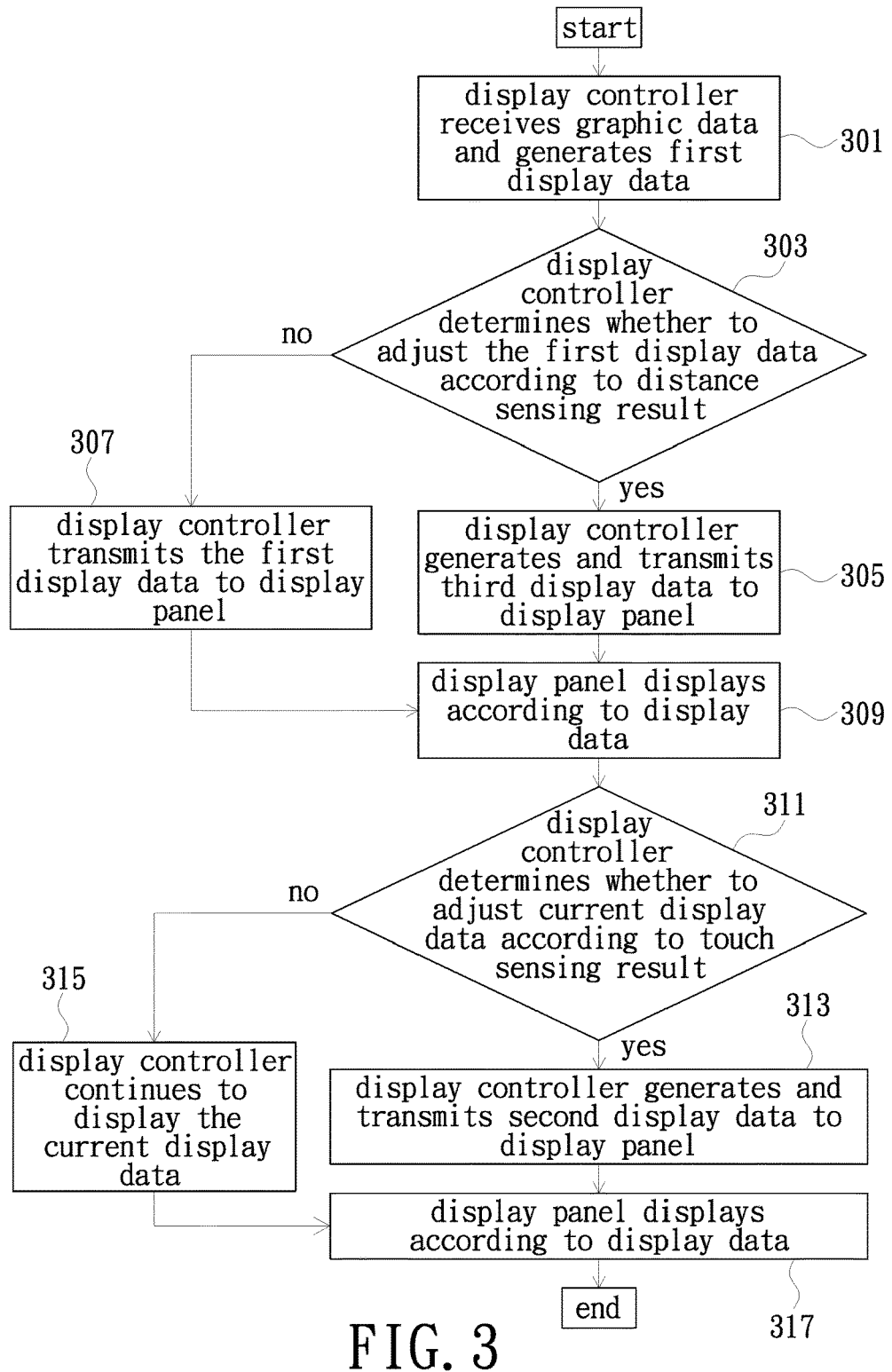
FIG. 3 is a flow chart of an operating method of a display device in accordance with the second embodiment of the present invention.

FIG. 3 is a flow chart of an operating method of the display device 10 in accordance with the second embodiment of the present invention. In this embodiment, the display device 10 uses both of the touch sensor controller 13 and the distance sensor controller 14 to adjust the display data. First, in step 301, the display controller 11 receives the graphic data from the electronic device 20 and generates the first display data according to the graphic data. Thereafter, in step 303, the display controller 11 determines whether to perform step 305 or step 307 according to the distance sensing result. Specifically, step 305 is performed when the distance sensing result indicates that the distance between a user and the distance sensor 141 is less than a predetermined distance; alternatively, step 307 is performed when the distance sensing result indicates that the distance between a user and the distance sensor 141 is not less than a predetermined distance. In step 305, since the distance between a user and the distance sensor 141 is less than a predetermined distance (i.e., the user is close to the display device 10), the display controller 11 adjusts the first display data to the third display data and transmits the third display data to the display panel 12. In step 307, since the distance between a user and the distance sensor 141 is not less than a predetermined distance (t i.e., no user is close to the display device 10), the display controller 11 displays according to the original first display data and transmits the first display data to the display panel 12. Thereafter, in step 309, the display panel 12 displays according to the received display data.

Thereafter, in step 311, the display controller 11 determines whether to adjust the current display data according to the touch sensing result. Specifically, step 313 is performed when the touch sensing result indicates that a touch event has occurred; alternatively, step 315 is performed when the touch sensing result indicates that no touch event has occurred. In step 313, since the touch sensing result indicates that a touch event occurs (i.e., a user touches the display device 10) and the user is closer to the display device 10 as compared with the distance in step 305, the display controller 11 adjusts the current display data (e.g., the first display data or the third display data) to the second display data and transmits the second display data to the display panel 12. In step 315, since the touch sensing result indicates that no touch event has occurred (i.e., a user does not touch the display device 10) and the user is not closer to the display device 10 as compared with the distance in step 305, the display controller 11 continues to display according to the current display data; that is, the display controller 11 transmits the first display data or the third display data to the display panel 12. Thereafter, in step 317, the display panel 12 displays according to the received display data, and the second embodiment of the present invention is completed. In this embodiment, the difference between the third display data and the first display data may be that the first brightness is larger than the third brightness; and the second display data is different from the first display data and the third display data in that the second color temperature is lower than the first color temperature and the third color temperature. That is, in this embodiment, when the distance sensing result indicates that a user is close to the display device 10, the display controller 11 first lowers the brightness of the first display data to generate the third display data; thereafter, when the touch sensing result indicates that the user touches the display device 10, the display controller 11 further lowers the color temperature of the third display data to generate the second display data; but the present invention is not limited thereto. The user can adjust any one of the above-mentioned display features to generate the second display data and the third display data according to specific requirements.

In summary, since the display controller 11 of the present invention can determine the distance between a user and the display device 10 according to the touch sensing result and the distance sensing result and adjust the display features of the current display data accordingly, the user would not suffer discomfort or injury to the eyes and can have significantly improved comfort even when viewing the display device 10 at a relatively short distance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
a display panel;
at least one touch sensor, configured to sense and output a touch sensing signal;
a touch sensor controller, electrically coupled to the at least one touch sensor and configured to receive the touch sensing signal and generate a touch sensing result accordingly;
a display controller, electrically coupled to the display panel and the touch sensor controller and configured to receive graphic data to generate first display data and determine whether to adjust the first display data to second display data and transmit the second display data to the display panel according to the touch sensing result, wherein the first display data has a first display feature, the second display data has a second feature, and the first display feature is different from the second display feature, wherein the first display feature is a first brightness or a first color temperature, and the second display feature is a second brightness or a second color temperature;
at least one distance sensor, configured to output a distance sensing signal; and
a distance sensor controller, electrically coupled to the at least one distance sensor and the display controller and configured to receive the distance sensing signal, generate a distance sensing result according to the received distance sensing signal, and transmit the distance sensing result to the display controller, wherein the display controller is further configured to determine whether to adjust the first display data to the second display data according to the distance sensing result and the touch sensing result.

2. The display device according to claim 1, wherein the second brightness is lower than the first brightness, and the second color temperature is lower than the first color temperature.

3. The display device according to claim 1, wherein the display device is rectangular shaped and comprises a first edge, a second edge, a third edge and a fourth edge, the first edge and the second edge are parallel to a horizontal line, the third edge and the fourth edge are perpendicular to the horizontal line, a location of the first edge is higher than a location of the second edge, and the first edge, the third edge, the second edge and the fourth edge are sequentially arranged clockwise, wherein the third edge and the fourth edge each has a length, and the at least one distance sensor is disposed at the third edge or the fourth edge and is spaced apart from the first edge for two thirds of the length of the third edge or the fourth edge.

4. An operating method of a display device, the display device comprising a display panel, a display controller, a touch sensor controller, at least one touch sensor, at least one distance sensor and a distance sensor controller, the display controller being electrically coupled to the display panel and the touch sensor controller, the at least one touch sensor being electrically coupled to the touch sensor controller and configured to output a touch sensing signal to the touch sensor controller, the touch sensor controller being configured to generate a touch sensing result according to the touch sensing signal, the at least one distance sensor is electrically coupled to the distance sensor controller and configured to output a distance sensing signal to the distance sensor controller, the distance sensor controller is configured to generate a distance sensing result according to the received distance sensing signal, and the operating method comprising steps of;

configuring the display controller to generate first display data according to graphic data;

configuring the display controller to determine whether to adjust the first display data to second display data according to the touch sensing result, and configuring the display controller to determine whether to adjust the first display data to the second display data according to the distance sensing result and the touch sensing result; and configuring the display panel to receive and display the first display data or the second display data, wherein the first display data has a first display feature, the second display data has a second feature, and the first display feature is different from the second display feature, wherein the first display feature is a first brightness or a first color temperature, and the second display feature is a second brightness or a second color temperature.

5. The operating method according to claim 4, wherein the second brightness is lower than the first brightness, and the second color temperature is lower than the first color temperature.

6. The operating method according to claim 4, wherein the step of configuring the display controller to determine whether to adjust the first display data to the second display data according to the touch sensing result comprises a step of:

configuring the display controller to adjust the first display data to the second display data and transmit the second display data to the display panel when the touch sensing result indicates that a touch event has occurred; or configuring the display controller to transmit the first display data to the display panel when the touch sensing result indicates that no touch event has occurred.

7. The operating method according to claim 4, wherein the step of configuring the display controller to determine whether, to adjust the first display data to the second display data according, to the distance sensing result and the touch sensing result comprises steps of:

configuring the display controller to determine whether to adjust the first display data to third display data according to the distance sensing result;

configuring the display controller to determine whether to adjust the third display data to the second display data according to the touch sensing result; and configuring the display panel to receive and display one of the first display data, the third display data and the second display data.

8. The operating method according to claim 7, wherein the third display data has a third display feature, the third display feature is a third brightness or a third color temperature, the second brightness is lower than the third brightness, and the second color temperature is lower than the third color temperature.

\* \* \* \* \*